United States Patent [19]

Esola

[11] 4,422,324

[45] Dec. 27, 1983

[54] FOUR CHAMBER DIRECT DRIVE GAS METER

[75] Inventor: John L. Esola, Falls Creek, Pa.

[73] Assignee: Rockwell International Corporation, Pittsburgh, Pa.

[21] Appl. No.: 323,330

[22] Filed: Nov. 20, 1981

[51] Int. Cl.³ .............................................. G01F 3/20
[52] U.S. Cl. .................................................... 73/266
[58] Field of Search ................................... 73/264–268

[56] References Cited

U.S. PATENT DOCUMENTS

| 21,663 | 10/1858 | Fisk | 73/266 |
| 814,359 | 3/1906 | Crawford | 73/266 |
| 1,238,453 | 8/1917 | Sprague | 73/266 |
| 1,668,078 | 5/1928 | Huettig | 73/268 |

Primary Examiner—Herbert Goldstein

[57] ABSTRACT

Disclosed is a four chamber gas meter in which the diaphragms are directly connected to the crank arms on the control shaft.

12 Claims, 13 Drawing Figures

FOUR CHAMBER DIRECT DRIVE GAS METER

BACKGROUND OF THE INVENTION

This invention relates to gas meters and, in particular, four chamber gas meters in which the diaphragms are directly connected to the tangent by means of which the valve or valves which control the flow of gas from the inlet into the chambers and from the chambers to the outlet, are operated. Conventional four chamber meters are typified by the meters disclosed in U.S. Pat. Nos. 2,544,665 and 2,818,046. In such meters the control chamber, which contains the tangent and the control valves, is located vertically above the measuring chambers which contain the diaphragms and, of course, is pressure sealed from the measuring chambers. Because of this vertical orientation, the linkage between the diaphragms and the tangent is relatively complex. This complex linkage not only contributes to the cost of producing the meter, but also imposes an increased drive torque on the diaphragms and therefore an increased pressure drop across the meter which could be minimized if the diaphragms could be directly connected to the tangent. Direct drive meters in which the diaphragms are directly connected to the tangent or control crank have long been known in connection with three chamber meters such as shown in U.S. Pat. Nos. 373,003 to Bell, 2,005,024 to Diehl and 2,068,378 to Diehl. In such meters, the third or middle chamber is the chamber contained between the two diaphragms and is also the control chamber in which the control valve is located which controls the flow of gas from the control chamber to the diaphragms. However, a three chamber meter of a weight and physical size equivalent to a four chamber gas meter does not have as great a capacity as the four chamber meter in terms of cubic feet of gas which may be passed through the meter under the same conditions.

In order to directly connect the diaphragms to the tangent or the control crank which drives the control valve, it is generally necessary to locate the tangent or control crank between the diaphragms as shown in the aforementioned patents disclosing three chamber meters and as shown in the following U.S. patents which disclose direct connected four chamber meters: No. 16,049 to Darlington & Piper, No. 527,979 to Henley et al., No. 814,359 to Crawford, No. 889,652 to Armstrong and No. 1,676,651 to Huettig. It will be noted that in each case four chamber meters have four measuring chambers, two formed by each of the diaphragms, each of the measuring chambers being pressure sealed and discrete from each other and form the control chamber in which the control valves are located. Thus, in order to connect the diaphragms with the tangent or control crank, it is necessary that the linkage from at least one of the diaphragms sealingly penetrates a wall which separates the measuring chamber formed by that diaphragm from the other measuring chambers and the control chamber. The method by which this penetration is made from the measuring chambers into the control chamber is important in determining the amount of friction that the seal penetrating member imposes on the diaphragms which, of course, directly affects the efficiency of the meter and the pressure drop across the meter, both of which factors are extremely important in providing a commercially acceptable meter.

The patent to Darlington et al. shows a four chamber meter with the control linkage for the control valve located generally between the opposed diaphragm chambers; however, the diaphragms are not directly connected to the tangent or the control crank, and it will be noted that the rods I, by what means of which the motion of the diaphragms is transmitted to the control chamber and valve, require a reciprocating seal. In order to be effective, such seals impose a greater frictional load on the diaphragms than the seal for a rotary shaft would impose, thereby imposing an increased load on the diaphragms.

The patent to Henley et al. likewise shows a four chamber meter in which the control mechanism is located directly between the diaphragm chambers. However, in order to seal the in-board measuring chambers between the diaphragms and the diaphragm housings, which is necessary to provide a four chamber meter, the patentee found it necessary to provide supplementary sealing diaphragms I and J. Thus, the control shaft is not directly accessible for direct connection to the diaphragms and the added complication of the seal diaphragms I and J render this arrangement unnecessarily complex and expensive.

The patent to Crawford also shows a four chamber meter with the control mechanism and linkage oriented between the opposed measuring chambers. However, the arrangement disclosed is extremely complicated in that the motion of the diaphragms is transmitted out of the measuring chamber through a sealed rotating shaft 26, and this rotary motion is transmitted through links 31 and 32 to the control shaft. Thus, the connection between the diaphragms and the control shaft is indirect and extremely complicated and relatively expensive to produce.

The patent to Armstrong also shows a four chamber meter with the control linkage between the diaphragms and the control valve physically located between the opposed diaphragm chambers. Again, the arrangement disclosed is extremely complicated in that the motion of the diaphragms is first transmitted to cranks 20 through links 17, 18, 21 and 26, the rotation of the cranks 20 being converted to linear motion and transmitted to the control valves 27 by means of link 26.

The patent to Huettig similarly discloses a four chamber gas meter with a portion of the control linkage being oriented between the diaphragm chambers. However, again as in the case of the above-mentioned prior art, in order to transmit the motion of the diaphragm 5 to the control valves 12, it was necessary to employ an extremely complex drive linkage. Also, since no portion of the shaft 17 is directly accessible to the chamber 9, this arrangement does not disclose an arrangement in which the control shaft is accessible for direct connection to both diaphragms.

To solve the problems inherent in the prior art, applicant has developed a compact, economical arrangement in which the penetration into the control chamber 15 is by means of an easily sealed rotary shaft, the shaft having respective portions, of each of which are directly accessible in respective ones of the measuring chambers associated with the diaphragm compartments to produce a compact, economical and accurate gas meter employing a drive mechanism requiring a minimum of effort to operate the control mechanism as hereinafter more fully described.

DESCRIPTION OF THE DRAWINGS

FIGS. 2–5B are various sections of FIG. 2 as described below but showing the control valve and cover which are not shown in FIG. 1;

DESCRIPTION OF A PREFERRED EMBODIMENT

Referring particularly to the drawings, FIGS. 1–5B, a meter embodying the instant invention may be comprised of two opposed diaphragm housing 22 and 24 separated by a central control section 20 which in turn is comprised of a control block 26 enclosed between a top cover 37 and bottom cover 39. A control block 26 within central section 20 has various control passages formed in it as will be hereinafter explained, and comprises one of the principal elements of the central control section 20. Diaphragm housings 22 and 24 are comprised, respectively, of inner housings 28 and 29 which may be formed integrally on opposite sides of the control block 26, as shown, and cover housings 30 and 31 secured, respectively, to the inner housings 28 and 29 by any convenient means, such as screws (not shown). Diaphragm housing 22 is divided into measuring chambers 32 and 34 and diaphragm housing 24 is divided into measuring chambers 36 and 38 by respective diaphragm assemblies 40 and 42. Each diaphragm assembly 40 and 42 is comprised of a rigid dish like pan 44 which is rigidly and sealingly secured to opposite sides of control block 26. Diaphragms 46, which are made of some flexible material such as an elastomer or a carefully selected leather, have their outer peripheries sealingly secured to the outer periphery of the pan 44 and their inner peripheries secured to a rigid metallic plate 48, whereby each diaphragm housing is divided into two discrete measuring chambers, that is, measuring chambers 32 and 34 within housing 22 and measuring chambers 36 and 38 within housing 31.

Control block 26 is formed with a bridge portion 50, having radially spaced concentric control chamber as hereinafter more specifically described. Bridge portion 50 has a central cylindrical hub 56 and radially spaced circular concentric walls 58 and 60. Hub 56 and wall 58 define a circular outlet chamber 62, which opens upwardly but is closed at its bottom. Outlet chamber 62 is connected to the meter outlet 88 by means of passage 86, both of which are formed in bridge portion 50.

Figure 1:
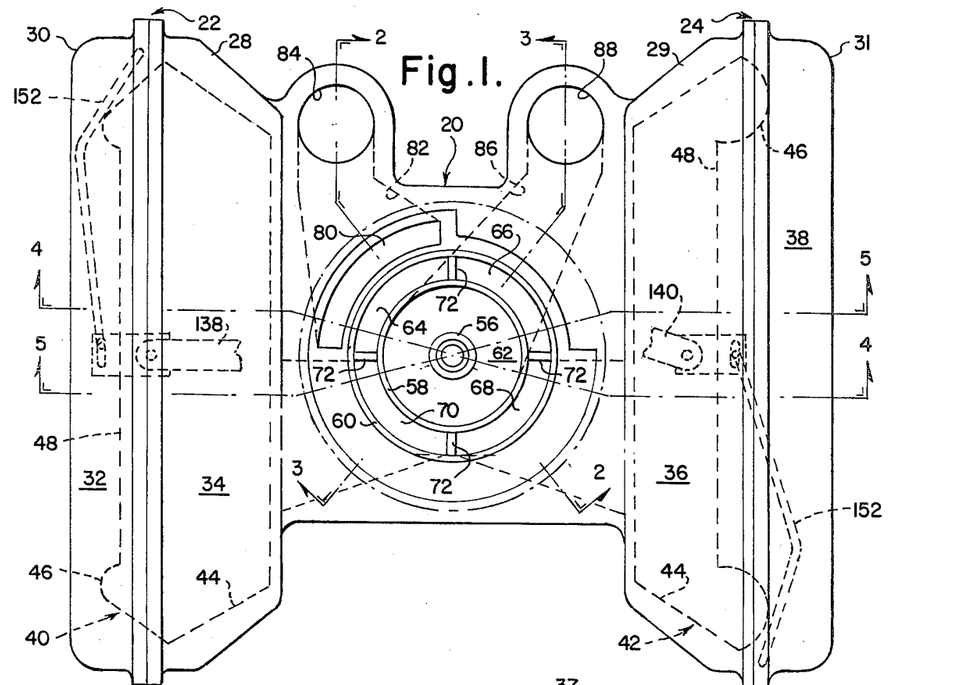
FIG. 1 is a top plan view of a meter employing applicant's invention with certain portions of the housing removed to show the control chamber and passages through the control section.
Figure 2:
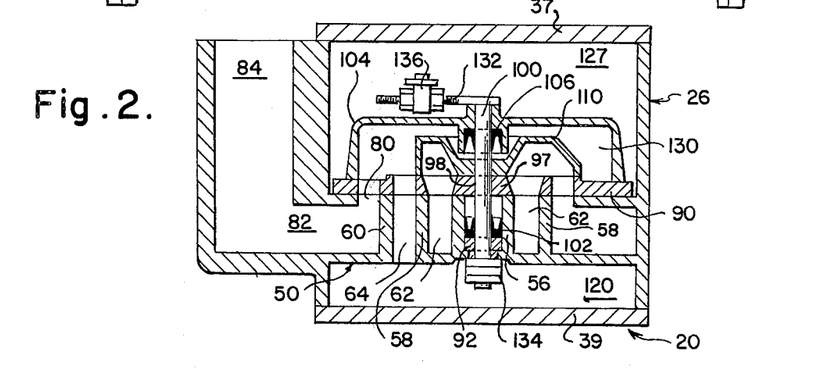
FIG. 2 is a view of a section along the line 2—2 of FIG. 1.
Figure 3:
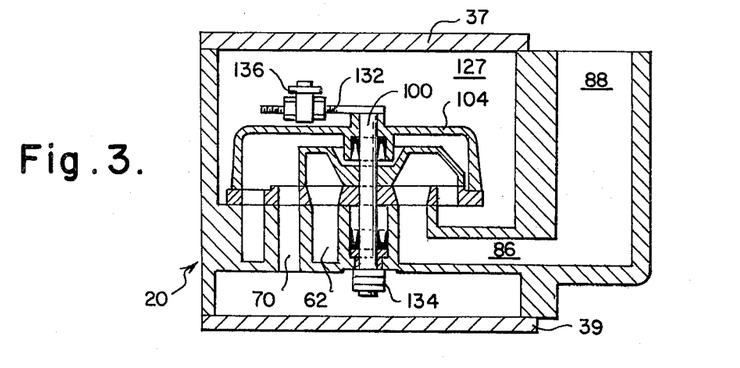
FIG. 3 is a view of a section along line 3—3 of FIG. 1.

Walls 58 and 60 define between them a circular chamber which is divided into four arcuate chambers 64, 66, 68 and 70 by radially extending walls 72, as best shown in FIG. 1. Each of the chambers 64, 66, 68 and 70, together with one adjoining wall 72, subtends an angle of 90 degrees around the axis of hub 56. Radially outward from wall 60, a closed bottom arcuate chamber 80 is formed in bridge portion 50. Passage 82 connects chamber 80 with the meter inlet 84.

Figure 4A:
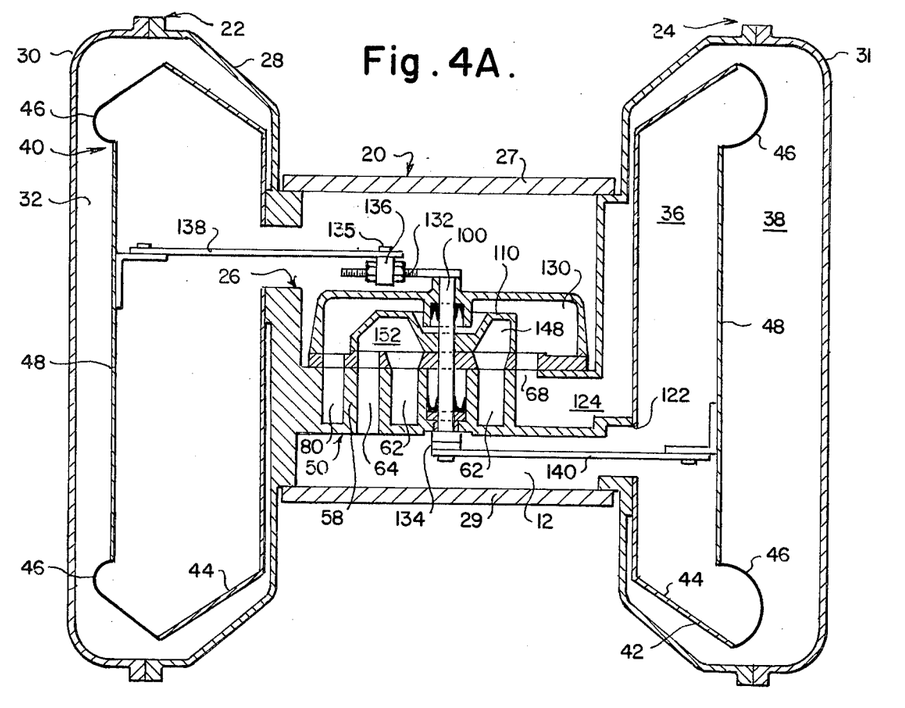
FIGS. 4A, 5A, 4B and 5B sequentially show the internal elements of the meeter and direction of fluid flow in successive positions and condition, FIGS. 4A and 4B being views taken along line 4—4 of FIG. 1 and FIGS. 5A and 5B being views taken along line 5—5 of FIG. 1.
Figure 4B:
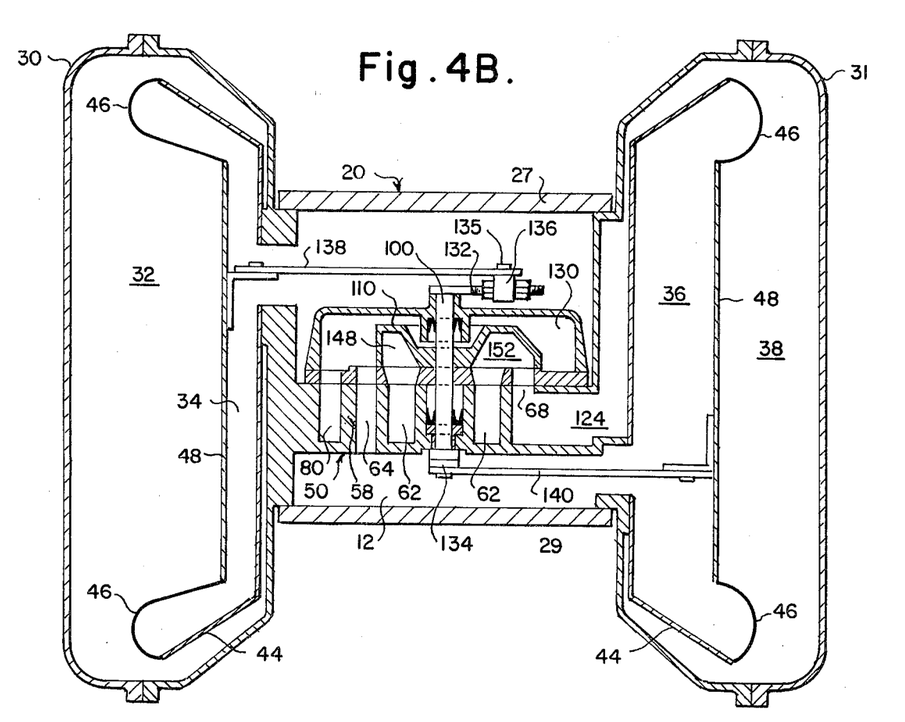
Figure 5A:
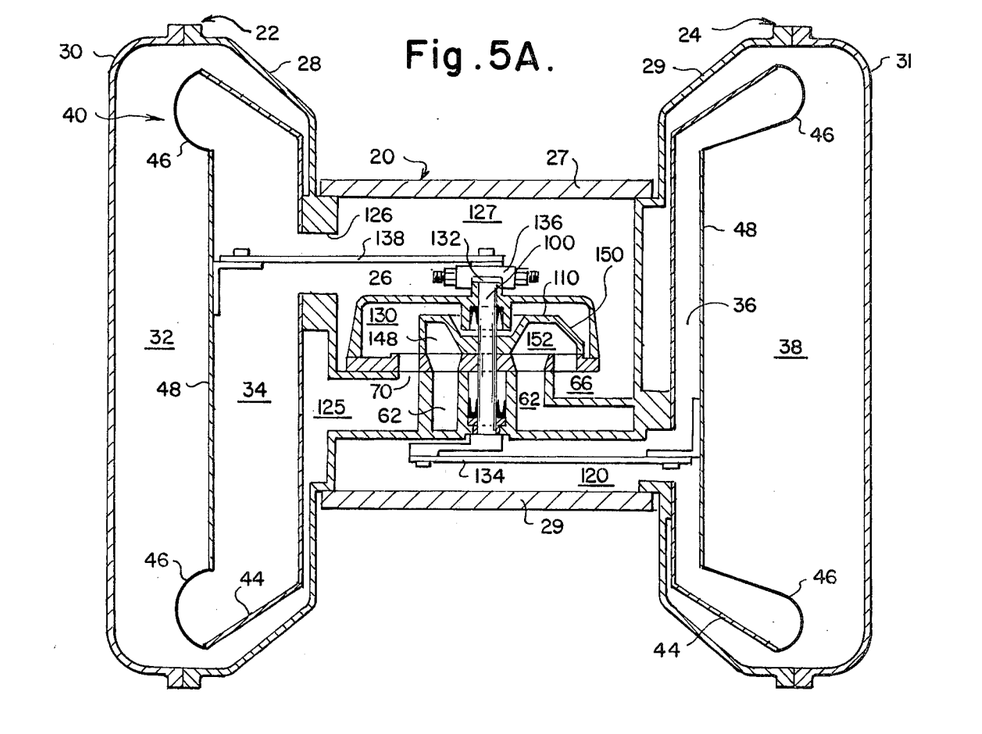
Figure 5B:
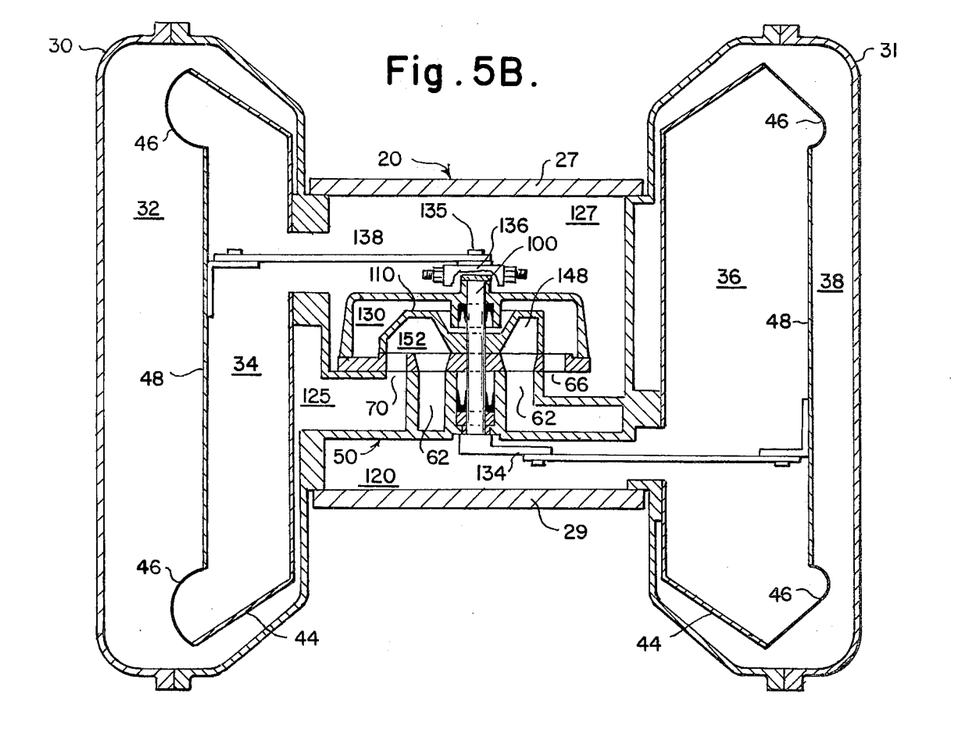

As best shown in FIGS. 4A and 4B, arcuate chamber 64 is connected to measuring chamber 36 through chamber 120 formed between bridge portion 50 of block 26 and bottom cover 39, and through opening 122 in pan 44, while arcuate chamber 68 is in communication with measuring chamber 38 through passage 124 formed in control block 26. As best shown in FIGS. 5A and 5B, arcuate chamber 66 is in communication with measuring chamber 34 through chamber 127 formed between top cover 37 and block 26, and through opening 126 formed in the control block and left pan 44. Also, arcuate chamber 70 is in communication with measuring chamber 32 through passage 125 formed in bridge portion 50 of block 26. It is important to note that chambers 120 and 127 are discrete and sealed from each other and that each is discrete and sealed from control chamber 130.

A valve seat plate 90 of suitable bearing material having openings which correspond to and are coextensive with outlet chamber 62 and arcuate chambers 64, 66, 68, 70 and 80, is secured to the top of bridge portion 50 so that the openings in the valve plate register with the arcuate chambers formed in the bridge portion. Radial spokes (not shown), serve to support hub portion 97, in which is formed opening 98, from the rest of the valve plate 90. Hub 56 encloses a cylindrical chamber in which a bushing 92 is provided. Control shaft 100 is journaled at one end in bushing 92 and in aligned opening 98 of valve seat plate 90. A resilient seal 102 is provided between shaft 100 and wall of hub 56 to prevent leakage of fluid along the shaft in the downward direction.

A control valve 110, which generally overlays the arcuate chambers in bridge portion 50, is secured to shaft 100 for rotation therewith by any suitable means such as a press fit. The upper end of shaft 100 is journaled in valve cover 104 which is secured in place on top of valve seat plate 90. Cover 104 encloses a control chamber 130 which includes the space immediately above the arcuate chambers formed in bridge portion 50 as well as the control valve 110. Suitable pressure seals 106 are provided between the shaft 110 and a cylindrical wall provided on the interior of cover 104 to prevent the escape of fluid pressure upwardly along shaft 100.

The upper end of shaft 100 projects above cover 104 sufficiently to permit one end of the crank arm 132 to be secured thereto. Similarly, the other end of shaft 100 projects below bridge portion 50 to permit one end of crank arm 134 to be secured thereto, as best showed in FIGS. 5A and 5B. A tangent 136 is threaded onto the upper crank 132 for radial adjustment with respect thereto, and a diaphragm link 138 has one end pivotally secured to left diaphragm plate 48 and the other end pivotally secured to a pivot post 135 on the tangent 136. In like manner, lower crank 134 has one end of diaphragm link 140 pivotally secured to it, the other end of the link 140 being pivotally secured to right diaphragm plate 48. In accordance with well known practice, the cranks 132 and 134 are angularly displaced from one another approximately 90 degrees. Also, as is well known in the art, the tangent 136 provides means to adjust the pivot post 135 radially of the axis of shaft 100 to vary the volume displaced by the diaphragm for each rotation of the shaft 100, as well as means to adjust the position of the pivot post 135 circumferentially of the crank 132 to adjust the timing of the valve 110.

Figure 10:
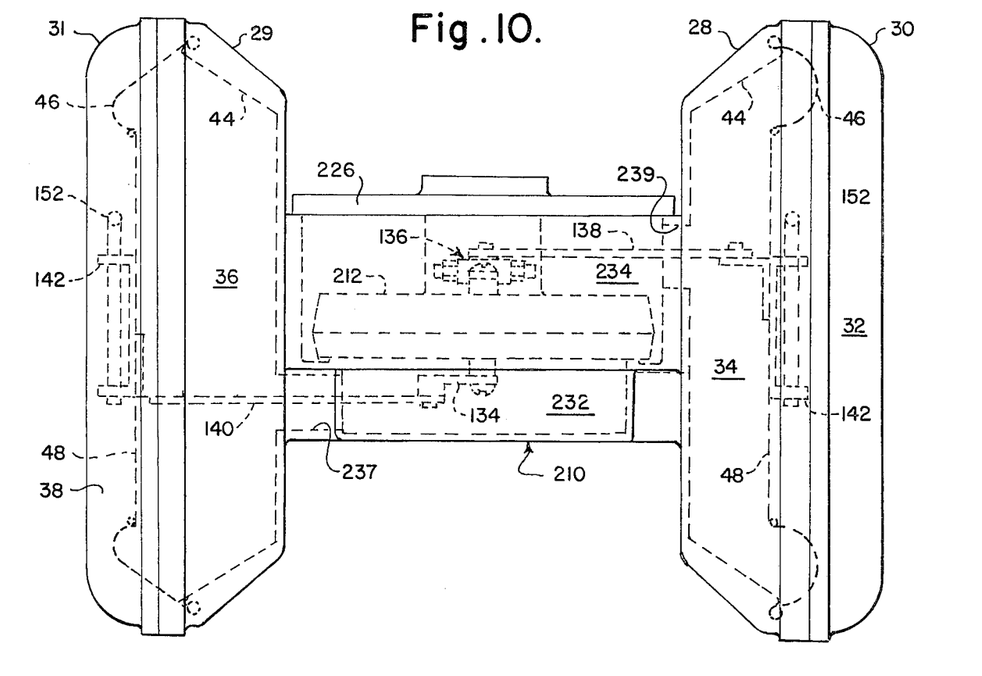
FIG. 10 is an elevation view of the meter of FIG. 8, viewed from the top of FIG. 8.

A support mechanism for the diaphragms is shown in dotted lines in FIGS. 1 and 10. Brackets 142 (FIG. 10) are secured to the outboard surfaces of diaphragm plates 48, and support brackets 144 are secured to the interior of housings 30 and 31. One end of support arms 145 is pivotally mounted in brackets 142 in a manner well known to permit pivotal motion between the bracket and the arm while preventing any relative vertical movement therebetween. In like manner, the other ends of the support arms 145 are pivotally mounted in brackets 144 to permit relative pivotal motion while preventing any vertical displacement between the two members. Thus, the diaphragm plates 48 are guided and supported for reciprocal linear motion within housings 22 and 24.

Figure 6A:
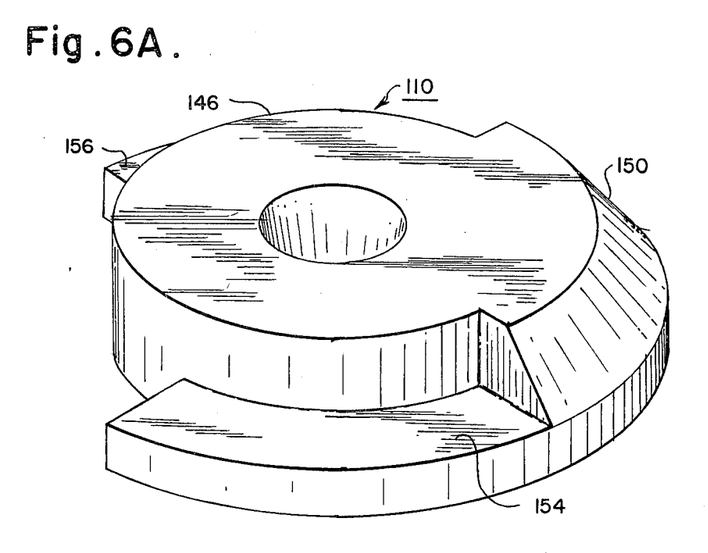
FIG. 6A is a perspective view of the control valve member and FIG. 6B is a partially sectional view similar to that of FIG. 6A.
Figure 6B:
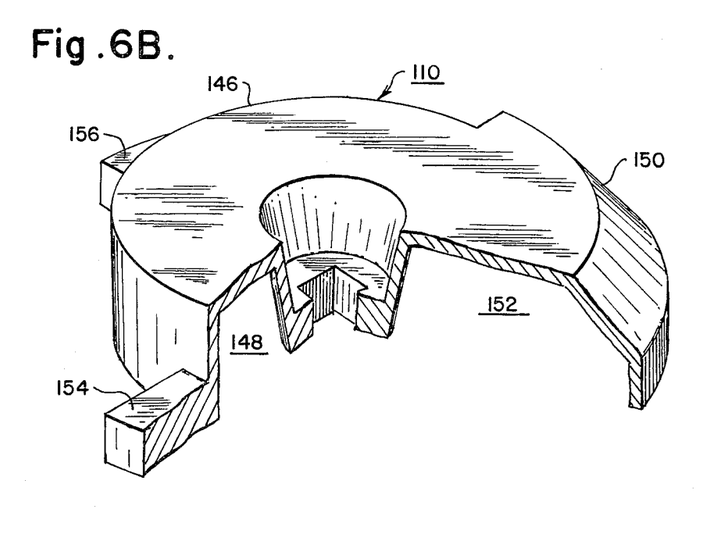

Control valve 110, the details of which are shown in FIGS. 6A and 6B, is comprised of a generally hollow central circular annular portion 146 which encloses an annular chamber 148. Central portion 146 merges with a bridging portion 150 which subtends a 90 degree arc and which encloses a bridging chamber 152. Chamber 148 and 152 are in communication with each other and both open toward the bottom but are closed by the top wall of valve 110.

Blocking flanges 154 and 156 extend radially from the outer wall of central portion 146 and extend circumferentially from each end of bridging portion 150 a circumferential distance which subtends an arc of 90 degrees about the axis of the valve member. The two flange portions 154 and 156 are therefore diametrically opposed and subtend an arc of 90 degrees, while bridging portion 150 is diametrically opposed to the open space between the ends of flange portions 154 and 156, which ends are spaced apart a circumferential distance subtending an arc of 90 degrees. Thus, the valve 110 is comprised of a bridging portion 150, two diametrically opposed flange portions 154 and 156, the bridge portion, and the flange portions, as well as the open space between the ends of the flange portions, all respectively subtending an arc of 90 degrees.

The operation of the embodiment described above will now be described with reference to FIGS. 1-5B, inclusive. It will be understood that as measuring chambers 34, 32, 36 and 38 are caused to sequentially expand and contract shaft 100 and valve 110 will be rotated through the movement of plates 48, links 138 and 140 and cranks 132 and 134.

FIG. 4A shows the position of the movable elements at a point where the left-hand diaphragm plate 48 has reached its extreme left-hand position and the right-hand diaphragm plate is moving toward the left and at a position approximately midway between its extreme left-hand and extreme right-hand portions. Thus, chamber 32 is fully exhausted, chamber 34 is completely filled, gas is flowing out of chamber 36, and is flowing into chamber 38. It will be understood that in all positions of the control valve 110 the arcuate inlet chamber 80 is in communication with control chamber 130. In the position of FIG. 4A, valve 110 is positioned so that bridging chamber 152 spans arcuate chambers 62 and 64 so that chambers 62 and 64 are in communication. Also, flange portion 154 covers chamber 66 (see FIG. 1) and flange portion 156 covers chamber 70 whereby gas flow into or out of these last two mentioned chambers is blocked. Thus, in the position shown in FIG. 4A, gas is flowing from inlet chamber 80 into control chamber 130 through arcuate chamber 68 into passage 124 and into measuring chamber 38. At the same time, gas being exhausted from chamber 36 is flowing through chamber 120, arcuate chamber 64, through chambers 152 and 148 into outlet chamber 62, and from there through passage 86 (FIG. 1) to outlet 88.

In the position of the elements shown in FIG. 5A, right-hand plate 48 has reached its extreme left-hand position and left-hand plate 48 is moving toward the right and is approximately midway between its extreme left-hand position and extreme right-hand position. Gas is being exhausted from chamber 34 and is being taken into chamber 32 and no gas is flowing either into or out of chambers 36 and 38. In this position, bridging chamber 152 of valve 110 spans arcuate chambers 62 and 66, flange portion 156 covers chamber 64 (FIG. 1), and flange portion 154 covers chamber 68, while chamber 70 is left uncovered by the space between the ends of the two flange portions 154 and 156, thus placing chamber 70 in communication with the control chamber 130. Gas is therefore being exhausted from chamber 34 through chambers 127 and 66, bridging chamber 152 into chamber 62 and from there into passage 86 and outlet 88. At the same time, gas from the inlet 84 and passage 82 (FIG. 1) is flowing into the chamber 130 since arcuate inlet chamber 80 is at all times in communication with chamber 130. From chamber 130, inlet gas passes through arcuate chamber 70 and through passage 125 into chamber 32.

The next sequential position is shown in FIG. 4B which shows the position of the moving elements at a point where the left-hand diaphragm plate 48 has reached its extreme right-hand position and right-hand diaphragm plate 48 is still moving toward the right. In this position, bridging chamber 152 of the control valve 110 connects chamber 68 with outlet chamber 62 while chamber 64 is left uncovered by the space between the ends of flanges 154 and 156, flange 154 covers chamber 70, and flange 156 covers chamber 66. Thus, the inlet 80 is connected to chamber 64 and outlet chamber 62 is connected to chamber 68, and movement of gas into or out of chambers 66 and 70 is blocked by the flanges 154 and 156. Gas is therefore flowing out of chamber 38 through passage 124, passage 68 through 152, outlet chamber 62, passage 86 and outlet 88, while at the same time gas is flowing from the inlet chamber 80, control chamber 130, chamber 64, chamber 120, and into chamber 36. Since chambers 66 and 70 are blocked, no gas is flowing into or out of chambers 32 and 34 at that point.

The next sequential position of the movable element is shown in FIG. 5B in which right-hand diaphragm plate 48 has reached its extreme right-hand position, and left-hand diaphragm plate 48 is moving toward the left and is at a point approximately midway between its extreme right-hand and left-hand positions. Gas is therefore flowing into chamber 34 and out of chamber 32 while there is no flow of gas into or out of chambers 36 and 38. In this position, bridging chamber 152 of valve 110 connects arcuate chamber 70 with outlet chamber 62 to allow the passage of gas out of measuring chamber 32 through passage 125 to the outlet 88. Chamber 64 is blocked by flange portion 154 of valve member 110, and chamber 68 is blocked by flange 156 while arcuate chamber 66 is embraced by the ends of the flange portion so that it is in communication with control chamber 130. Therefore, gas is flowing out of chamber 32 through passage 125, chambers 70, and 152, and outlet chamber 62, and into chamber 34 through chamber 66 and chamber 130. Since chambers 64 and 68 are blocked, there is no flow of gas into or out of measuring chambers 36 and 38.

The immediately foregoing describes the positions of the movable parts and the flow of gas through the various passages and chambers when each of the left-hand and the right-hand diaphragm plates 48 are in their extreme right-hand and left-hand positions. Since the cranks 132 and 134 are angularly displaced by approximately 90 degrees, when one diaphragm pan is in one extreme position, the other diaphragm pan is moving one way or the other. It will be appreciated, however, that in intermediate positions of the control valve 110 various arcuate chambers 62, 64, 66, 68 and 70 will be interconnected with adjacent arcuate chambers whereby gas will be simultaneously exhausted from measuring chamber 34 and taken into measuring chamber 36, while at the same time being simultaneously exhausted from measuring chamber 38 and taken into measuring chamber 32. At other intermediate positions of the control valve 110 the various arcuate chambers will be interconnected with the inlet 80 and outlet chamber 62, whereby gas will be taken into chambers 34 and 36 while being simultaneously exhausted from chambers 32 and 38.

Figure 7:
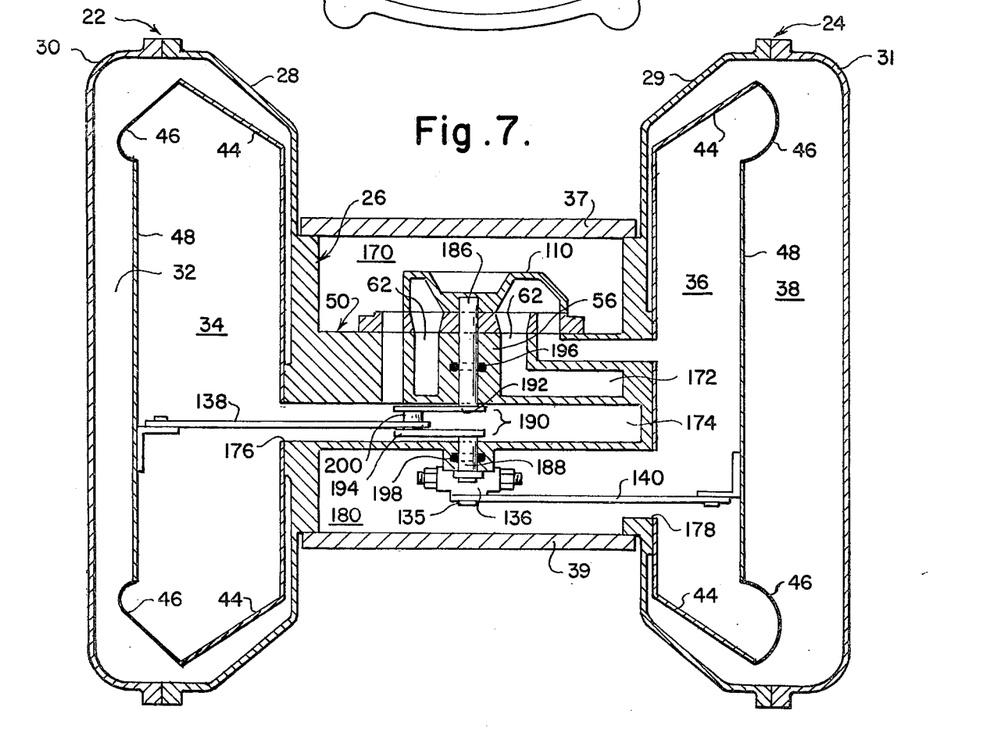
FIG. 7 is a vertical section similar to the views shown in FIGS. 4A, 4B, 5A and 5B showing an alternative embodiment of the invention.

An alterntive form of the invention is shown in FIG. 7 in which both diaphragm plates 48 are moving toward the left with the left-hand plate approaching its extreme left-hand position. The essential difference in the embodiment of FIG. 7 from the embodiment shown in FIGS. 1–5B is that both cranks are rotated at one end of the control shaft rather than at opposite ends of the control shaft as shown in FIGS. 1–5B. As in the case of the previous embodiment, a control block 26 has a bridge portion denoted generally by the numeral 50 in which, as in the case of the previous embodiment, is formed a circular outlet chamber 62 and hub 56. In this embodiment, the meter inlet (not shown) communicates directly with control chamber 170 which is formed between top cover 37 and bridge portion 50. Outlet chamber 62 communicates with passage 172 which in turn leads to the meter outlet (not shown). Chamber 174 communicates with measuring chamber 34 through opening 176 and left-hand diaphragm pan 44, while chamber 180 which is formed between bridge portion 50 and bottom cover 39 communicates with measuring chamber 36 through an opening 178 in the right-hand diaphragm pan 44. Chamber 38 is in communication through passages (not shown) to an arcuate chamber (also not shown) which is in communication with the chamber 170 in the position of valve 110 shown in FIG. 7. Also, measuring chamber 32 is in communication through passages (not shown) with an arcuate chamber (not shown) formed in bridge portion 50, which is in communication with outlet chamber 62 in the position shown for valve 110.

Again, it should be noted that chambers 174 and 180 which communicate, respectively, with measuring chambers 34 and 36, are discrete and sealed from each other and both are discrete and sealed from control chamber 170. Shaft portion 186 is journaled in hub 56, the upper end extending into control chamber 170 to which the valve 110 is secured; the lower end projecting into chamber 174 to which one end of arm 192 of crank 190 is connected. Shaft portion 186 is sealed against the leakage of gas between chambers 170 and passage 172 by a seal 196. Shaft portion 188 is journaled into the wall which separates chambers 174 and 180, its opposite ends extending into chambers 174 and 180. Leakage of gas between chambers 174 and 180 is prevented by a seal 198. One end of arm 194 is connected to the upper end of the shaft 188 within chamber 174, and tangent 136 is connected to the end of shaft 188 which projects into chamber 180. The other ends of arms 192 and 194 are connected together by a pivot pin 200 to which one end of diaphragm link is pivotally connected, the other end of the link being pivotally connected to left-hand plate 48. As in the embodiment described above, one end of diaphragm link 140 is pivotally connected to the tangent 136, the other end of the link being pivotally connected to right-hand diaphragm plate 48. The operation of FIG. 7 embodiment is essentially the same as the embodiment of FIGS. 1–5B. Thus when gas is alternately admitted into the measuring chambers in the manner similar to that described in the embodiments of FIGS. 1–5B, the measuring chambers 32, 34, 36 and 38 will be alternately filled and exhausted in sequence which, through the action of the links 138 and 140, will cause the control shaft comprised of portions 186 and 188 to thereby rotate the control valve 110. Again, it is important to note that opposite ends of the control shaft are respectively directly accessible to opposed measuring chambers, which chambers are discrete and sealed from each other and from the control chamber 170. The essential difference between the two embodiments being that in the FIGS. 1–5B embodiment the cranks are located at opposite ends of the control shaft, one above the bridge portion 5B and one below it while in the embodiment of FIG. 7 both cranks are located below the bridge poetion 5B.

Figure 8:
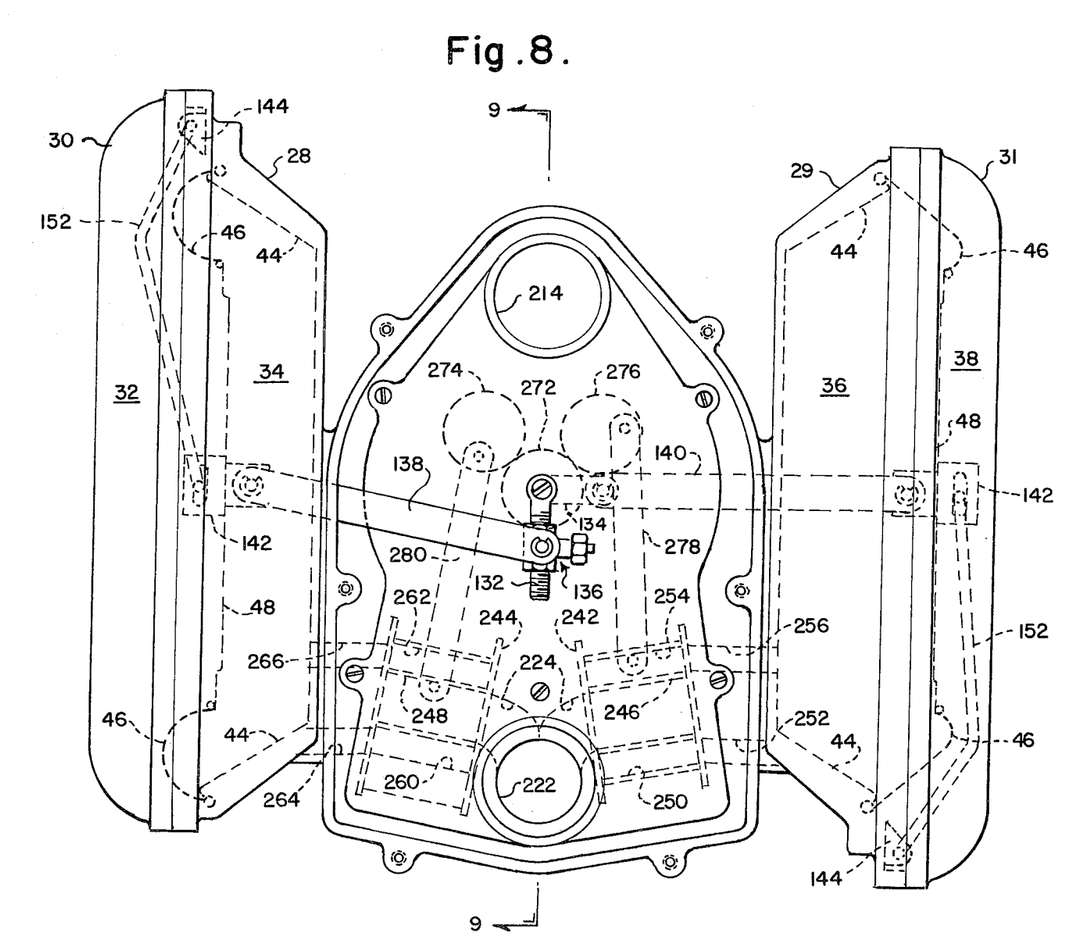
FIG. 8 is a top plan view of an alternative embodiment of a meter employing the invention described herein utilizing slide valves instead of a rotary valve, some of the internal mechanism being shown in dotted lines.
Figure 9:
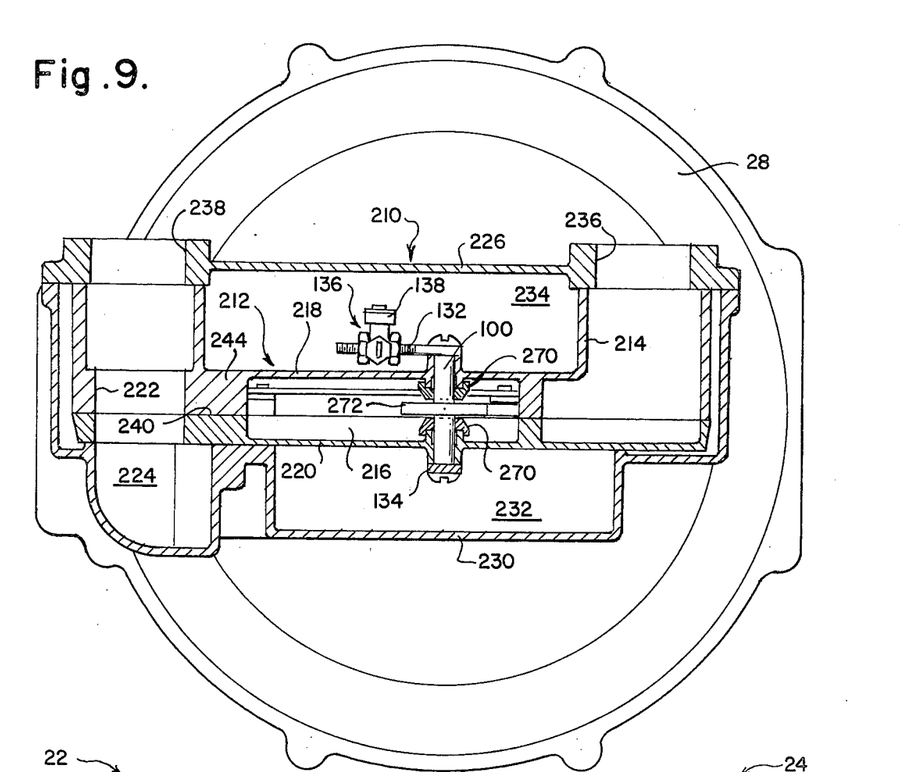
FIG. 9 is an elevation side view of the meter shown in FIG. 8 taken along the line 9—9.

While the invention described herein may be most economically and advantageously employed in connection with the embodiments described above which utilize a rotary control valve, the instant invention may also be advantageously employed with slide-type valves as shown in FIGS. 8, 9 and 10. In this further embodiment, the diaphragm housings, diaphragm assemblies and diaphragm links are the same as those disclosed in FIGS. 1–7 and are similarly numbered.

As best seen in FIGS. 9 and 10, a generally hollow control section generally indicated by the number 210 encloses a control module 212 which is comprised of an upper portion 218 and lower portion 220 which when secured together enclose a control chamber 216, and an inlet passage 214 which communicates with the control chamber 216. The upper portion 218 and lower portion 220 have registering openings to produce outlet passage 222, the lower end of which communicates with outlet chamber 224 within main body portion 230 of the control section. The control section 210 is comprised of a main body portion 230 into which the control module 220 is received to form crank chamber 232. A top cover 226 is secured to the main body portion 230 to provide a tangent chamber 234 between the control module and the top cover 226. Top cover 226 has an inlet opening 236 which registers with inlet passage 214 and an outlet opening 238 which registers with outlet passage 222. Chambers 232 and 234 are sealed and discrete with respect to each other and each are sealed and discrete with respect to control chamber 216. Chamber 232 is in continuous communication with measuring chamber 36 through opening 237 and chamber 234 is in continuous communication with measuring chamber 34 through opening 239 (FIG. 10).

The lower portion 220 of the control module has a valve seat surface 240 formed on it on which two control valves 242 and 244 (FIG. 8) are mounted for sliding movement. The valve seat surface 240 has outlet openings 246 and 248, each of which communicates with outlet chamber 224 in main body portion 230 of the control section. Also associated with valve 242 are openings 250 and 254 formed in the valve surface 240 on either side of opening 246. Opening 250 communicates with measuring chamber 38 through passage 252, and opening 254 communicates with measuring chamber 36 through passage 256. A similar set of openings 260 and 262 are formed in the valve seat surface 240 on either side of opening 248. Opening 260 communicates with measuring chamber 32 through passage 264 while opening 262 communicates with measuring chamber 34 through passage 266. It will be appreciated that each of the valves 242 and 244 provides a bridging chamber of sufficient dimension to bridge the outlet opening 246 with either one of the openings 250 or 256 and outlet opening 248 with either one of openings 260 or 262. Thus, during operation when control valve 244 is in the position to bridge openings 246 and 250, measuring chamber 38 is connected to outlet opening 246 and outlet chamber 224, while measuring chamber 36 is connected to control chambe 216 through passage 256 and opening 254. When valve 242 is in the position to bridge opening 246 with opening 254, measuring chamber 38 is connected to control chamber 216 through passage 252 and opening 250, and measuring chamber 36 is connected to outlet chamber 224 through passage 256, and openings 254 and 246. Similarly, valve 244 will alternately bridge openings 260 and 248 and then openings 242 and 248 to sequentially connect the measuring chambers 32 and 34 to the control chamber 216 and the outlet chamber 224.

Referring to FIG. 9 control shaft 100 is journaled in the upper and lower sections of the control module 212 and has its central portion enclosed within control chamber 216. The upper end of the the control shaft extends into chamber 234 and the lower end extends into chamber 232. Seals 270 seal the central section of the shaft from chambers 232 and 234 and prevent leakage of fluid from control chamber 216 into either of the chambers 232 and 234. As in the cse of the embodiments of FIGS. 1–5B, the upper end of control shaft 100 has crank 132 secured to it on which is threadedly mounted tangent 136. Diaphragm 138 has one end pivotally secured to the tangent 136 and the other end pivotally secured to the left diaphragm plate 48 as shown in FIG. 8. The lower end of shaft 100 which projects into chamber 232 has secured to it crank 134 to which one end of diaphragm link 140 is pivotally secured, the other end of the link being pivotally secured to the right diaphragm plate 48 as shown in FIG. 8.

Within chamber 216 gear 272 (FIGS. 8 and 9) is secured to the central portion of the shaft 100. Gear 272 meshes with and drives gears 274 and 276 which are also mounted for rotation within chamber 216. One end of valve link 278 is pivotally connected to control valve 242 and its other end is pivotally and eccentrically connected to gear 276. Similarly, one end of valve link 280 is pivotally secured to control valve 244, the other end of the link being pivotally and eccentrically connected to gear 274.

As gas under pressure is sequentially admitted to and exhausted from the measuring chambers 32, 36, 34 and 38, the shaft 100 will be rotated and the control valves 242 and 244 will be moved back and forth on the valve surface 240 by the gears 276 and 274 and the valve links 278 and 280. Valves 242 and 244 are guided in purely reciprocating linear motion by guides not shown but in a manner well known in the art. As in the case of the embodiments of FIGS. 1–7B, the crank 132 is approximately 90 degrees angularly displaced from the crank 134 and the tangent 136 may be threadedly adjusted on the crank 132 to provide the proper timing for connecting the various openings in the valve seat surface by their respective valves 242 and 244. Thus, as valve 242 bridges openings 250 and 246, valve 244 will bridge openings 248 and 262 so that chambers 34 and 38 will be connected to the outlet to exhaust measuring chambers 34 and 38, while openings 254 and 260 are exposed to the interior of control chamber 216 so that measuring chambers 32 and 36 are connected to the chamber 216 and inlet 214. As the diaphragms continue to move, the cranks 132 and 134 and the control shaft 100 will be rotated to position the control valve 242 and 244 to connect measuring chambers 34 and 38 to the chamber 216 and inlet 214 while measuring chambers 32 and 36 are connected to the outlet 222.

It should be noted that as in the case of the embodiments of FIGS. 1–7, the chambers 232 and 234, which are discrete from each other and from the control chamber 216, are in communication with and directly accessible respectively to measuring chamber 36 and measuring chamber 34 and the shaft 100 has a section enclosed within the control chamber, said section being drive connected to the control valves. Also, opposite ends of the control shaft 100 project respectively into chambers 232 and 234 where they are respectively directly connected to the right (FIG. 8) diaphragm plate 48 through crank 134 and link 140 and the left diaphragm plate 48 through crank 132, tangent 136 and link 138. Thus, in all embodiments described hereinabove the diaphragms are directly connected to the control shaft which has portions directly accessible for connection to the diaphragm; and the drive to the control valves within the control chamber is by means of a rotary shaft which sealingly penetrates the control chamber.

The invention herein described may be embodied in other specific forms without departing from the essential characteristics thereof. The present embodiments, therefore, are to be considered as illustrative, the scope of the invention being indicated by the appended claims. All departures from the foregoing description which come within the meaning and range of equivalency of the claims are therefore intended to be embraced herein.

I claim:

1. A gas meter comprised of two spaced diaphragm compartments each containing a diaphragm which divides its respective compartment into inner and outer discrete measuring chambers, a control chamber pressure sealed with respect to said measuring chambers and the exterior of the meter, discrete passage means extending between each of said measuring chambers and said control chamber, inlet passage means extending between said control chamber and the inlet to said meter, outlet passage means extending between said control chamber and the outlet of said meter, valve means within said control chamber, rotatable shaft means having a first portion enclosed within said control chamber and which is drive connected with said valve means and a second portion which extends exteriorly of said control chamber, crank means drive connected with said second portion of said shaft means, and means connecting said diaphragms to said crank means whereby upon concomitant reciprocating movement of said diaphragms said valve means will be driven to connect each of said discrete passages sequentially with said inlet passage means and said outlet passage means, the second portion of said shaft being comprised of two extensions of said shaft each extending from an opposite side of said control chamber, and said crank means is comprised of a crank arm secured to each of said extensions, each of said diaphragms being respectively connected to one of said crank arms.

2. The invention defined in claim 1 together with respective crank chambers each enclosing one of said shaft extensions.

3. The invention defined in claim 2 in which one of said crank chambers is in communication with one of said inner measuring chambers and the other crank chamber is in communication with the other of said inner measuring chambers.

4. A gas meter comprised of two spaced compartments each containing a movable wall which divides its respective compartments into two measuring chambers to form four measuring chambers each of which is discrete from the other, a control chamber pressure sealed with respect to said measuring chambers and the exterior of the meter, discrete passage means extending between each of said measuring chambers and said control chamber, inlet passage means extending between said control chamber and the inlet to said meter, oulet passage means extending between said control chamber and the outlet of said meter, valve means within said control chamber, rotatable shaft means comprised of a first portion enclosed within said control chamber, a second portion which is directly accessible to a measuring chamber associated with one of said compartments and a third portion which is directly accessible to a measuring chamber associated with the other compartment, said first portion being drive connected to said valve means, respective crank means drive connected with said second and third portions of said shaft means and means connecting each of said diaphragms respectively to one of said crank means whereby upon concomitant reciprocating movement of said diaphragms said valve means will be driven to connect each of said discrete passages sequentially with said inlet passage means and said outlet passage means, said second and third portions of said shaft means extending from opposite sides of said control chamber.

5. The invention defined in claim 4 together with respective crank chambers each enclosing respective ones of said second and third portions of said drive shaft.

6. The invention defined in claim 5 in which each of said crank chambers is in communication with a measuring chamber associated with one movable wall and the other crank chamber is in communication with a measuring chamber associated with the other movable wall.

7. A gas meter comprised of two spaced diaphragm compartments each containing a diaphragm which divides its respective compartment into inner and outer discrete measuring chambers, a central control section juxtaposed with and extending between said compartments and comprised of a control chamber and two crank chambers, said crank chambers being sealed and discrete from each other and from said control chamber, each of said crank chambers being respectively in communication with one of said inner measuring chambers, discrete passage means for placing each of said crank chambers and each of said outer measuring chambers respectively in communication with said control chamber, valve means within said control chamber, unitary rotatable shaft means extending into said control chamber and drive connected with said valve means, said shaft means having a portion extending into said crank chambers, crank means on said portion of said shaft means, and means directly connecting said diaphragms to said crank means whereby upon concomitant reciprocating movement of said diaphragms said valve means will be driven to connect each of said discrete passage means sequentially with said inlet passage means and said outlet passage means.

8. The invention defined in claim 7, in which said crank chambers and said control chamber are vertically disposed with respect toeach other when said diaphragm compartments are horizontally disposed with respect to each other.

9. The invention defined in claim 8, in which one of said crank chambers is disposed above said control chamber and the other crank chamber is disposed below said control chamber and said portion of said shaft is comprised of two extensions of said shaft each extending from an opposite side of said control chamber into respective crank chambers.

10. The invention defined in claim 8, in which said crank chambers are contiguous to each other.

11. The invention defined in claim 8, in which said valve means is a rotary valve.

12. The invention defined in claim 8, in which said valve means is comprised of reciprocating slide valve means.

* * * * *